(12) United States Patent
Cho et al.

(10) Patent No.: US 12,109,541 B2
(45) Date of Patent: Oct. 8, 2024

(54) CHEMICALLY RESISTANT ISOPOROUS CROSSLINKED BLOCK COPOLYMER STRUCTURE

(71) Applicant: TeraPore Technologies, Inc., South San Francisco, CA (US)

(72) Inventors: Jae C. Cho, San Francisco, CA (US); Nanetta Pon, San Francisco, CA (US); Spencer William Robbins, San Francisco, CA (US); Rachel M. Dorin, San Francisco, CA (US)

(73) Assignee: TERAPORE TECHNOLOGIES, INC., South San Francisco, CA (US)

( * ) Notice: Subject to any disclaimer, the term of this patent is extended or adjusted under 35 U.S.C. 154(b) by 0 days.

(21) Appl. No.: 16/772,074

(22) PCT Filed: Sep. 19, 2018

(86) PCT No.: PCT/US2018/051711
§ 371 (c)(1),
(2) Date: Jun. 11, 2020

(87) PCT Pub. No.: WO2019/060390
PCT Pub. Date: Mar. 28, 2019

(65) Prior Publication Data
US 2020/0360871 A1    Nov. 19, 2020

Related U.S. Application Data

(60) Provisional application No. 62/560,452, filed on Sep. 19, 2017.

(51) Int. Cl.
*B01D 71/80*    (2006.01)
*B01D 67/00*    (2006.01)
(Continued)

(52) U.S. Cl.
CPC ......... *B01D 71/80* (2013.01); *B01D 67/0006* (2013.01); *B01D 67/009* (2013.01);
(Continued)

(58) Field of Classification Search
CPC .. B01D 71/80; B01D 67/0006; B01D 67/009; B01D 2323/30; B01D 2323/345;
(Continued)

(56) References Cited

U.S. PATENT DOCUMENTS 3,673,272 A    6/1972   Dean
4,014,798 A *  3/1977   Rembaum ............. G01N 30/96
                                                 210/500.33

(Continued)

FOREIGN PATENT DOCUMENTS

CA    2886437 A1    5/2014
CA    3022510 A1    11/2017
(Continued)

OTHER PUBLICATIONS

Doàn Minh Ý Nhi, "Investigation of the Effects of UV-Crosslinking on Isoporous Membrane Stability." KTH Chemical Science and Engineering, pp. 1-46, 2011.

(Continued)

*Primary Examiner* — Krishnan S Menon
(74) *Attorney, Agent, or Firm* — Johnson, Marcou, Isaacs & Nix, LLC; John S. Sears

(57) ABSTRACT

Isoporous block copolymers of cross-linked structures, and methods of preparing, which are resistant to harsh solvent conditions from organic, acidic or basic materials are disclosed.

14 Claims, 5 Drawing Sheets

(51) Int. Cl.
*C08J 5/18* (2006.01)
*C08J 9/00* (2006.01)

(52) U.S. Cl.
CPC .............. C08J 5/18 (2013.01); C08J 9/0061 (2013.01); *B01D 2323/30* (2013.01); *B01D 2323/345* (2013.01); *C08J 2300/10* (2013.01); *C08J 2300/20* (2013.01)

(58) Field of Classification Search
CPC ........ C08J 5/18; C08J 9/0061; C08J 2300/10; C08J 2300/20; C08J 3/24; C08J 9/20; C08J 9/36; C08K 5/09; C08K 5/17; C08K 5/37
See application file for complete search history.

(56) References Cited

U.S. PATENT DOCUMENTS

| | | | |
|---|---|---|---|
| 4,399,035 A | 8/1983 | Nohmi et al. |
| 4,666,991 A | 5/1987 | Matsui et al. |
| 4,720,343 A | 1/1988 | Walch et al. |
| 4,880,441 A | 11/1989 | Kesting et al. |
| 5,114,585 A | 5/1992 | Kraus et al. |
| 5,130,024 A | 7/1992 | Fujimoto et al. |
| 5,158,721 A | 10/1992 | Allegrezza et al. |
| 5,700,902 A | 12/1997 | Hancock et al. |
| 5,700,903 A | 12/1997 | Hancock et al. |
| 5,792,227 A | 8/1998 | Kahlbaugh et al. |
| 5,805,425 A | 9/1998 | Peterson |
| 5,907,017 A | 5/1999 | Ober et al. |
| 5,928,792 A | 7/1999 | Moya |
| 6,033,370 A | 3/2000 | Reinbold et al. |
| 6,241,886 B1 | 6/2001 | Kitagawa et al. |
| 6,354,443 B1 | 3/2002 | Moya |
| 6,379,796 B1 | 4/2002 | Uenishi et al. |
| 6,503,958 B2 | 1/2003 | Hughes et al. |
| 6,565,782 B1 | 5/2003 | Wang et al. |
| 6,592,764 B1 | 7/2003 | Stucky et al. |
| 6,592,991 B1 | 7/2003 | Wiesner et al. |
| 6,663,584 B2 | 12/2003 | Griesbach, III et al. |
| 7,056,455 B2 | 6/2006 | Matyjaszewski et al. |
| 7,438,193 B2 | 10/2008 | Yang et al. |
| 7,927,810 B2 | 4/2011 | Togawa et al. |
| 8,025,960 B2 | 9/2011 | Dubrow et al. |
| 8,147,685 B2 | 4/2012 | Pritchard |
| 8,206,601 B2 | 6/2012 | Bosworth et al. |
| 8,294,139 B2 | 10/2012 | Marsh et al. |
| 8,939,294 B2 | 1/2015 | Moore et al. |
| 9,162,189 B1 | 10/2015 | Aamer et al. |
| 9,169,361 B1 | 10/2015 | Aamer |
| 9,193,835 B1 | 11/2015 | Aamer |
| 9,441,078 B2 | 9/2016 | Aamer |
| 9,469,733 B2 | 10/2016 | Aamer et al. |
| 9,527,041 B2 | 12/2016 | Wiesner et al. |
| 10,711,111 B2 | 7/2020 | Wiesner et al. |
| 10,912,868 B2 | 2/2021 | Ushiro et al. |
| 2003/0073158 A1 | 4/2003 | Ma |
| 2003/0171560 A1 | 9/2003 | Peters |
| 2003/0226818 A1 | 12/2003 | Dunbar et al. |
| 2004/0065607 A1 | 4/2004 | Wang et al. |
| 2004/0122388 A1 | 6/2004 | Mccormack et al. |
| 2004/0126778 A1 | 7/2004 | Lemmens et al. |
| 2004/0129678 A1 | 7/2004 | Crowley et al. |
| 2004/0138323 A1 | 7/2004 | Stenzel-Rosebaum et al. |
| 2004/0167327 A1 | 8/2004 | Colberg et al. |
| 2004/0242822 A1 | 12/2004 | Gawrisch et al. |
| 2006/0014902 A1 | 1/2006 | Mays et al. |
| 2006/0085062 A1 | 4/2006 | Lee et al. |
| 2006/0094598 A1 | 5/2006 | Simon |
| 2006/0151374 A1 | 7/2006 | Wu et al. |
| 2006/0283092 A1 | 12/2006 | Chinone |
| 2007/0029256 A1 | 2/2007 | Nakano et al. |
| 2007/0265174 A1 | 11/2007 | Schlenoff |
| 2007/0287241 A1 | 12/2007 | Takahashi et al. |
| 2008/0097271 A1 | 4/2008 | Lo et al. |
| 2008/0193818 A1 | 8/2008 | Mays |
| 2008/0261255 A1 | 10/2008 | Tolosa et al. |
| 2009/0173694 A1 | 7/2009 | Peinemann et al. |
| 2009/0181315 A1 | 7/2009 | Spatz et al. |
| 2009/0208726 A1 | 8/2009 | Yang et al. |
| 2009/0209726 A1 | 8/2009 | Matsumoto et al. |
| 2009/0239381 A1 | 9/2009 | Nishimi et al. |
| 2010/0051546 A1 | 3/2010 | Vuong et al. |
| 2010/0108599 A1 | 5/2010 | Vizvardi et al. |
| 2010/0167271 A1 | 7/2010 | Ryan |
| 2010/0181288 A1 | 7/2010 | Tang et al. |
| 2010/0219383 A1 | 9/2010 | Eklund |
| 2010/0224555 A1 | 9/2010 | Hoek et al. |
| 2011/0130478 A1 | 6/2011 | Warren et al. |
| 2011/0240550 A1 | 10/2011 | Moore et al. |
| 2011/0275077 A1 | 11/2011 | James et al. |
| 2012/0048799 A1 | 3/2012 | Na et al. |
| 2012/0318741 A1 | 12/2012 | Peinemann et al. |
| 2013/0053748 A1 | 2/2013 | Cotton |
| 2013/0112613 A1 | 5/2013 | Kang et al. |
| 2013/0129972 A1 | 5/2013 | Xu |
| 2013/0193075 A1 | 8/2013 | Liang et al. |
| 2013/0344375 A1 | 12/2013 | Brant et al. |
| 2014/0005364 A1 | 1/2014 | Gottschall et al. |
| 2014/0217012 A1 | 8/2014 | Wiesner et al. |
| 2014/0363572 A1 | 12/2014 | Moll et al. |
| 2014/0371698 A1 | 12/2014 | Chang et al. |
| 2015/0151256 A1 | 6/2015 | Abetz et al. |
| 2015/0336058 A1 | 11/2015 | Hillmyer et al. |
| 2015/0343395 A1 | 12/2015 | Aamer et al. |
| 2016/0023171 A1 | 1/2016 | Phillip et al. |
| 2016/0229969 A1 | 8/2016 | Wiesner et al. |
| 2016/0288062 A1 | 10/2016 | Ait-Haddou et al. |
| 2016/0319158 A1 | 11/2016 | Fleury et al. |
| 2016/0375409 A1 | 12/2016 | Stasiak et al. |
| 2017/0022337 A1 | 1/2017 | Wiesner et al. |
| 2017/0105877 A1 | 4/2017 | Buteux et al. |
| 2017/0144109 A1 | 5/2017 | Powell et al. |
| 2017/0327649 A1* | 11/2017 | Wiesner .............. B01D 67/0079 |
| 2018/0043314 A1 | 2/2018 | Onyemauwa et al. |
| 2018/0043656 A1 | 2/2018 | Song et al. |
| 2020/0047135 A1 | 2/2020 | Mok et al. |
| 2020/0238227 A1 | 7/2020 | Dorin et al. |
| 2020/0339770 A1 | 10/2020 | Wiesner et al. |
| 2021/0040281 A1 | 2/2021 | Dorin et al. |

FOREIGN PATENT DOCUMENTS

| | | |
|---|---|---|
| CN | 1505541 A | 6/2004 |
| CN | 201211329 Y | 3/2009 |
| CN | 101460203 A | 6/2009 |
| CN | 101516481 A | 8/2009 |
| CN | 101969902 A | 2/2011 |
| CN | 102224163 A | 10/2011 |
| CN | 102892486 A | 1/2013 |
| CN | 103797053 A | 5/2014 |
| CN | 104159657 A | 11/2014 |
| CN | 104768506 A | 7/2015 |
| CN | 105273211 A | 1/2016 |
| CN | 105536580 A | 5/2016 |
| CN | 105709616 A | 6/2016 |
| DE | 102012207338 A1 | 11/2013 |
| DE | 102014213027 A1 | 1/2016 |
| EP | 2160946 A1 | 3/2010 |
| EP | 2703016 A1 | 3/2014 |
| EP | 2705077 A2 | 3/2014 |
| EP | 3056260 A1 | 8/2016 |
| EP | 3284529 A1 | 2/2018 |
| EP | 3541500 A1 | 9/2019 |
| EP | 3544720 A1 | 10/2019 |
| EP | 3658262 A1 | 6/2020 |
| FR | 3037071 A1 | 12/2016 |
| JP | 54-145766 A | 11/1979 |
| JP | 04-022428 A | 1/1992 |
| JP | 08115892 | 5/1996 |
| JP | 09-048861 A | 2/1997 |
| JP | 2002-537422 A | 11/2002 |
| JP | 2005-500132 A | 1/2005 |
| JP | 2006-175207 A | 7/2006 |

(56) References Cited

FOREIGN PATENT DOCUMENTS

| | | |
|---|---|---|
| JP | 2011-117956 A | 6/2011 |
| JP | 2011-131208 A | 7/2011 |
| JP | 2011-189229 A | 9/2011 |
| JP | 2012-246162 A | 12/2012 |
| JP | 2015-083299 A | 4/2015 |
| JP | 2015-167914 A | 9/2015 |
| JP | 2015-529555 A | 10/2015 |
| JP | 2016027080 A | 2/2016 |
| JP | 2016-514049 A | 5/2016 |
| JP | 2016-526089 A | 9/2016 |
| JP | 2017-153616 A | 9/2017 |
| JP | 2018-500401 A | 1/2018 |
| JP | 2019-514687 A | 6/2019 |
| JP | 2020-513301 A | 5/2020 |
| KR | 10-2009-0088124 A | 8/2009 |
| KR | 10-2012-0047269 A | 5/2012 |
| KR | 10-2012-0124412 A | 11/2012 |
| KR | 2012-0124412 A | 11/2012 |
| KR | 10-2015-0041002 A | 4/2015 |
| KR | 10-2016-0020404 A | 2/2016 |
| KR | 10-2018-0019059 A | 2/2018 |
| SG | 10201706492V | 3/2018 |
| SG | 11201904425 Y | 6/2019 |
| SG | 11202000664 Y | 2/2020 |
| WO | 2005/082501 A1 | 9/2005 |
| WO | 2005/091755 A2 | 10/2005 |
| WO | 2008/034487 A1 | 3/2008 |
| WO | 2010/051150 A1 | 5/2010 |
| WO | 2011/098851 A1 | 8/2011 |
| WO | 2011/111679 A1 | 9/2011 |
| WO | 2011/123033 A1 | 10/2011 |
| WO | 2012/151482 A2 | 11/2012 |
| WO | 2014/164793 A2 | 10/2014 |
| WO | 2014207150 A1 | 12/2014 |
| WO | 2015/048244 A1 | 4/2015 |
| WO | 2015/168409 A1 | 11/2015 |
| WO | 2015/188225 A1 | 12/2015 |
| WO | 2016/023765 A1 | 2/2016 |
| WO | 2016/031834 A1 | 3/2016 |
| WO | 2016/066661 A1 | 5/2016 |
| WO | 2017189697 A1 | 11/2017 |
| WO | 2018/043209 A1 | 3/2018 |
| WO | 2018/055801 A1 | 3/2018 |
| WO | 2018/093714 A1 | 5/2018 |
| WO | 2018/097988 A1 | 5/2018 |
| WO | 2019/023135 A1 | 1/2019 |
| WO | 2019/178045 A1 | 9/2019 |
| WO | 2019/178077 A1 | 9/2019 |
| WO | 2019/195396 A1 | 10/2019 |

OTHER PUBLICATIONS

Lawrence E. Nielsen, "Cross-Linking-Effect on Physical Properties of Polymers." Journal of Marcomolecular Science Part C, vol. 3(1), pp. 69-103, 2008.

A Bruil et al., "The Mechanisms of Leukocyte Removal by Filtration." Transfusion Medicine Reviews vol. IX No. 2, pp. 145-166, Apr. 1995.

A. A. Shukla et al., "Recent Advances in Large-Scale Production of Monoclonal Antibodies and Related Proteins." Trends in Biotechnology, vol. 28, No. 5, pp. 253-261, 2010.

A.S. Devonshire et al., "Towards Standardisation of Cell-Free DNA Measurement in Plasma: Controls for Extraction Efficiency, Fragment Size Bias and Quantification." Anal. Bioanal. Chem., vol. 406, pp. 6499-6512, 2014.

Behler, Ansgar (Edited by), "Poren," Rompp Verlag, Rompp online 4.0, Aug. 2005, retrieved from Internet: URL: https://roempp.thieme.de/roempp4.0/do/data/RD-16-03734.

Breiner et al., "Structural Characterization of the "Knitting Pattern" in Polystyrene-block-poly(ethylene-co-butylene)-block-poly(methyl methacrylate) Triblock Copolymers", Macromolecules 1998, 31, 135-141.

Clodt et al., "Performance study of isoporous membranes with tailored pore sizes", Journal of Membrane Science, vol. 495, Jul. 29, 2015, pp. 334-340.

D. Keskin, et al., "Postmodification of PS-b-P4VP Diblock Copolymer Membranes by ARGET ATRP." Langmuir, vol. 30, pp. 8907-8914, Jun. 19, 2014.

Dai et al., "Fabrication of 2D ordered structure of self-assembled block copolymers containing gold nanoparticles," Journal of Crystal Growth, vol. 288, No. 1, pp. 128-136, Feb. 2, 2006.

E. Gifford et al., "Sensitivity Control of Optical Fiber Biosensors Utilizing Turnaround Point Long Period Gratings with Self-Assembled Polymer Coatings." Proceedings of the SPIE, vol. 6659 pp. 66590D-1-66590D-9 Sep. 30, 2007.

F. A. Carey, Ornanic Chemistry, Fifth Edition, pp. 859-860, 2003.

Fink, Johannes Karl. Handbook of Engineering and Specialty Thermoplastics. 2011. vol. 2, Water Soluble Polymers. Chapter 7. pg. 189-192. (Year: 2011).

H. Ahlbrecht et al., "Stereoselective synthesis." Methods of Organic Chemistry. Houben-Weyl, vol. E 21 a, 4th Edition Supplement, 1995.

H. Sai et al., "Hierarchical Porous Polymer Scaffolds from Block Copolymers." Science, vol. 341, pp. 530-533, Aug. 2, 2013.

Hanselmann, Blockcopolymere, ROMPP Online, Version 3.37, Dokumentkennung RD-02-02007. Jul. 1, 2009.

Hilke et al., "Block copolymer/homopolymer dual-layer hollow fiber membranes", Journal of Membrane Science, vol. 472, Aug. 23, 2014, pp. 39-44.

Hoek et al., Physical-chemical properties, separation performance, and fouling resistance of mixed-matrix ultrafiltration member, Desalination, Elsevier, vol. 283, pp. 89-99. May 4, 2011.

Huang Yan et al: "Highly Ordered Mesoporous Carbonaceous Frameworks from a Template of a Mixed Amphiphilic Triblock-Copolymer System of PEO-PPO-PEO and Reverse PPO-PEO-PPO", Chemistry—An Asian Journal, vol. 2, No. 10, Oct. 1, 2007 (Oct. 1, 2007), pp. 1282-1289.

J. I. Clodt et al., "Carbohydrates as Additives for the Formation of Isoporous PS-b-P4VP Diblock Copolymer Membranes." Macromolecular Rapid Communications, vol. 34, 190-194, 2013.

J. Suzuki et al., "Morphology of ABC Triblock Copolymer/Homopolymer Blend Systems." Journal of Polymer Science Part B: Polymer Physics vol. 40 pp. 1135-1141 Apr. 22, 2002.

Julie N.L. Albert et al. "Self-assembly of block copolymer thin films", Materialstoday, vol. 13, is. 6, Jun. 2010, pp. 24-33.

Jung et al., Structure Formation of Integral Asymmetric Composite Membranes of Polystyrene-block-Poly(2-vinylpuridine) on a Nonwoven, Macromolecular Materials and Engineering, vol. 297, No. 8, pp. 790-798. Feb. 9, 2012.

Kanegsberg, "Washing, Rinsing, and Drying: Items to Consider for the Optimization of Your Cleaning Process," https://www.materialstoday.com/metal-finishing/features/washing-rinsing-and-drying-items-to-consider-for/, Sep. 1, 2005. p. 2, paragraph 6.

Karunakaran et al. "IsoporousIPS-b-PEO ultrafiltration membranes via self-assembly and water-induced phase separatioln" Journal of Membrane Science, vol. 453 Issue 1 (Nov. 16, 2013): pp. 471-477.

Khademi, M. Application of Tubular Crssflow Microfiltration in Harvesting Microalgae. LSU Master's Theses. 2014, pp. 39-43.

Kharitonov et al., "Surface modification of polymers by direct fluorination: A convenient approach to improve commercial properties of polymeric articles," Pure Appl. Chem., vol. 81, No. 3, pp. 451-471, 2009.

Laboratory-Equipment.com, "Applications for Laboratory Ovens Across the Sciences." https://www.laboratory-equipment.com/blog/all-laboratory-equipment-blogs/applications-for-laboratory-ovens-across-the-sciences/, Oct. 15, 2015, p. 1, section "Standard and Specialized Lab Oven Applications".

Li Yuk Mun et al: "Asymmetric Membranes from Two Chemically Distinct Triblock Terpolymers Blended during Standard Membrane Fabrication", Macromolecular Rapid Communications, vol. 37, No. 20, Oct. 1, 2016 (Oct. 1, 2016), pp. 1689-1693.

Lubomir et al., "Deposition of polymeric perfluored thin films in proton ionic membranes by plasma processes," Applied Surface Science, vol. 254, pp. 173-176, 2007.

(56) References Cited

OTHER PUBLICATIONS

Mu X. et al., Nano-porous Nitrocellulose Liquid Bandage Modulates Cell and Cytokine Response and Accelerates Cutaneous Wound Healing in a Mouse Model. Carbohydr Polym., Sep. 25, 2015, vol. 136, pp. 618-629.
N. Lefevre et al., "Self-Assembly in Thin Films of Mixtures of Block Copolymers and Homopolymers Interacting by Hydrogen Bonds." Macromolecules, vol. 43, No. 18, pp. 7734-7743 Aug. 17, 2010.
Parul Jain et.al., "Protein purification with polymeric affinity membranes containing functionalized poly (acid) brushes", Biomacromolecules, 2010, vol. 11, No. 4, 1019-1026.
Peinemann et al., "Asymmetric superstructure formed in a block copolymer via phase separation", Nature Materials, V6, Dec. 2007, pp. 992-996.
Phillip, W., et al., Tuning Structure and Properties of Graded Triblock Terpolymer-Based Mesoporous and Hybrid Films, Nano Letters, Jun. 7, 2011, Nov. 11, pp. 2892-2900.
Qiu et al. "Selective Separation of Similarly Sized Proteins with Tunable Nanoporous Block Copolymer Membranes." ACS Nano. vol. 7, No. 1, 2013. p. 768-776 (Year: 2013).
R. van Reis et al., "High Performance Tangential Flow Filtration." Biotechnology and Bioengineering, vol. 56, No. 1, pp. 71-82, Oct. 5, 1997.
Radjabian, Polymer, 55 (2014), 2986-2997 (Year: 2014).
Ren et al, J. Am. Chem. Soc, 1998, 120, 6830-6831 (Year: 1998).
Roland et al., "Supplementary Information Block Copolymer/Homopolymer Dual-Layer Hollow Fiber Membranes Imaging and Characterization Lab and c Water Desalination", Aug. 23, 2014, pp. 1-3.
S. Breitbach et al., "Direct Quantification of Cell-Free, Circulating DNA from Unpurified Plasma." PLOS One, vol. 9, Issue 3, e87838. pp. 1-11.
S. P. Nunes et al., "From Micelle Supramolecular Assemblies in Selective Solvents to Isoporous Membranes." Langmuir, DOI 10.1021/la201439P, Jun. 28, 2011.
S. Rangou et al., "Self-Organized Isoporous Membranes with Tailored Pore Sizes." Journal of Membrane Science, vol. 451, pp. 266-275, 2014.
Shahkaramipour et al., "Membranes with Surface-Enhanced Antifouling Properties for Water Purification," Membranes, vol. 7, pp. 13, 2017.
Tiraferri et al., Binding Silver and Silica Nanoparticles to Polymeric Membrane Surfaces for Novel Anti-Biofouling Properties, ACS Division Proceedings, Division of Polymer Chemistry, Meeting 242, Aug. 28-Sep. 1, 2011, Denver, CO, USA. Sep. 1, 2011.
Volker Abetz "Isoporous Block Copolmer membranes", Macromolecular Rapid Communications, vol. 36, No. 1, Nov. 29, 2014 (Nov. 29, 2014), pp. 10-22.
Wang Zhaogen et al: "Isoporous membranes with gradient porosity by selective swelling of UV-crosslinked block copolymers", Journal of Membrane Science, vol. 476, Feb. 1, 2015 (Feb. 1, 2015), pp. 449-456.
Y Nhi et al., "Investigation of the Effect of UV-Crosslin King On Isoporous Membrane Stability", Chemical Science and Engineering, vol. 46, Dec. 12, 2011.
Yizhou Zhang et al: "Nanoporous membranes generated from self-assembled block polymer precursors: Quo Vadis?", Journal of Applied Polymer Science, vol. 132, No. 21, Jun. 5, 2015.
Yizhou Zhang, et al., "Microfiltration and Ultrafiltration Membrane Science and Technology". Journal of Applied Polymer Science, app. 41683, on. 1-17, 2015.
Young et al., Robert J., Introduction to Polymers, Third Edition, CRC Press 2011, pp. 6-9 and 456-457.
Muller, H. E., et al., "Towards Nanoporous Membranes based on ABC Triblock Terpolymers", small, vol. 3, No. 6, pp. 1056-1063.
Louten, "Virus Structure and Classification", Chapter 2, Essential Human Virology, 2016, p. 19-29) (Year: 2016).
Polak, et al., "Deposition of polymeric perfluored thin films in proton ionic membranes by plasma processes", Applied Surface Science, vol. 254, pp. 173-176, 2007.
Roux, et al., "Hydrophilisation of polysulphone ultrafiltration membranes by incorporation of branched PEO-block-PSU copolymers", Journal of Membrane Science 276, 2006, 8-15 (Year: 2006).
Sperschneider, et al., "Towards Nanoporous Membranes based on ABC Triblock Terpolymers", small, vol. 3, No. 6, pp. 1056-1063, 2007.
Li, et al., "Effect of Humidity on Surface Structure and Permeation of Triblock Terpolymer derived SNIPS Membranes", J. Polymer, vol. 126, May 17, 2017, 368-375.
Zhang, et al., "High-Performance Asymmetric Isoporous Nanocomposite Membranes with Chemically-Tailored Amphiphilic Nanochannels", Electronic Supplementary Material (ESI) for Journal of Materials Chemistry A. This journal is The Royal Society of Chemistry 2020, 2020, 1-29.
Zhang, et al., "High-Performance Asymmetric Isoporous Nanocomposite Membranes with Chemically-Tailored Amphiphilic Nanochannels", Journal of Materials Chemistry A, vol. 8, No. 9, Mar. 16, 2020, 9554-9566.

\* cited by examiner

CHEMICALLY RESISTANT ISOPOROUS CROSSLINKED BLOCK COPOLYMER STRUCTURE

CROSS-REFERENCE TO RELATED PATENT APPLICATIONS

This application claims the benefit of priority to U.S. Provisional Patent Application Ser. No. 62/560,452, filed Sep. 19, 2017, the entirety of which is incorporated herein by reference.

FIELD OF THE INVENTION

Isoporous block copolymers of cross-linked structures, and methods of preparing, which are resistant to harsh solvent conditions from organic, acidic or basic materials.

BACKGROUND OF THE INVENTION

Multiblock copolymers used to achieve self-assembled isoporous structures are amenable to generating high flux, solvent-resistant, isoporous materials. Additionally, the nature of block copolymers allows for multi-functionality of the materials, whereas one block can impart significant chemical resistance (if crosslinked, for example) while the other blocks provide other functionalities, e.g. mechanical integrity. These materials are particularly useful as chemically resistant membranes for separations.

Cross-linking of polymers, block or otherwise, prior to pore formation are known, See for example, Wang et al. (J. Mem. Sci., 476, 2015, 449-456); Decker et al. (Macromol. Chem. Phys. 200, 1999, 1965-1974.); U.S. Pat. Nos. 3,864,229; 8,865,841 B2.

BRIEF DESCRIPTION OF THE DRAWINGS

FIG. 1A is the cross-section of the membrane before DMF exposure.

FIG. 1B is the selective surface of the material before DMF exposure.

FIG. 1C is the cross-section of the material after DMF exposure.

FIG. 1D is the selective surface of the material after DMF exposure.

FIG. 2A is the selective surface of the material before THF exposure.

FIG. 2B is the selective surface of the material after THE exposure.

FIG. 3A is the cross-section of the material before PGMEA exposure.

FIG. 3B is the selective surface of the material before PGMEA exposure.

FIG. 3C is the cross-section of the material after PGMEA exposure.

FIG. 3D is the selective surface of the material after PGMEA exposure.

SUMMARY OF THE INVENTION

Figure 1:
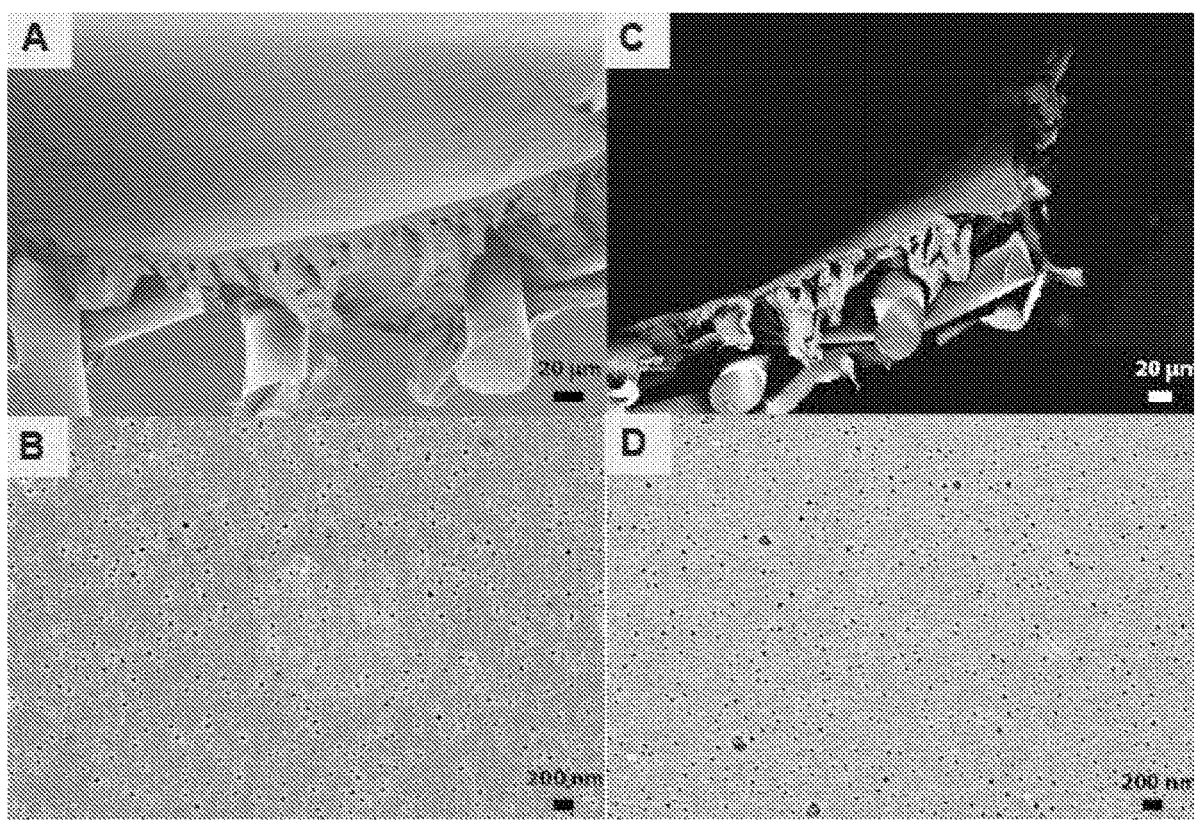
FIG. 1A-1D are scanning electron images of a crosslinked poly(isoprene)-b-poly(styrene)-b-poly(4-vinylpyridine) isoporous asymmetric membrane (as described below before and after (DMF) dimethylformamide exposure).

The invention relates to hierarchically porous, isoporous crosslinked block copolymer structures, i.e., cross-linked structures, where at least one of the blocks is chemically modified to have chemical resistance properties to harsh solvent conditions from organic, acidic or basic materials, and other blocks provide mechanical integrity to the structure, to enhance their suitability for various environments. The multiblock polymer is chemically modified and crosslinked after the formation of the isoporous multiblock polymer material whereby sites within and along wall surfaces defining pores are crosslinked.

The present invention relates to block copolymer structures where at least one of the blocks is chemically crosslinked to impart chemical resistance to harsh solvent conditions from organic, acidic or basic materials, and other blocks provide mechanical integrity to the structure, to enhance its suitability for various separation environments, after isoporosity is obtained.

The invention also includes separating an analyte of interest with high permeability and excellent selectivity, the membrane has uniform porosity, by contacting a non-aqueous liquid containing an analyte of interest with the isoporous crosslinked block polymer structures with at least two distinct polymer blocks.

The invention also includes separating an analyte of interest with high permeability and excellent selectivity from a harsh chemical mixture generated by organic, acidic or basic liquids and the analyte of interest, by contacting the mixture with the isoporous crosslinked block polymer structure.

The invention also includes a process of maintaining the integrity of an isoporous block polymer structures by chemically modifying at least one of the blocks with a crosslinking reaction after isoporosity is obtained.

DETAILED DESCRIPTION OF THE INVENTION

The invention is an isoporous structure, e.g., a membrane, film, fabric, monolith which comprises at least one multiblock polymer (MBP) where at least one block of at least one MBP includes at least a portion that is crosslinked. In this context, isoporous means having a substantially narrow pore diameter distribution. The incorporation of crosslinking imparts chemical resistance properties to the isoporous block copolymer (BCP) structure. The crosslinked material may exhibit increased resistance to temperature or harsh media compared to the uncrosslinked material. This combination of crosslinked polymer blocks in a multiblock copolymer (e.g. A-B, A-B-A, A-B-C, A-B-C-A, A-B-A-B, A-B-C-D, or A-B-C-D-E, etc.) structure, produced by self-assembly, results in a high permeability and high selectivity isoporous structure for separations in non-aqueous liquid media, e.g., organic or harsh liquid media. The material comprises at least two classes of pores: macropores and mesopores, at least one class of which are isoporous. The mesopores may have pore diameters from about 1 nm to 200 nm. The macropores may have pore diameters from about 200 nm to about 100 microns. An isoporous region comprises a pore (void), a pore lining polymer region, and a polymer matrix region.

Nonlimiting examples of block copolymer architectures, are identified in Table 1. Different letters denote different chemistries, [A], [B], [C], etc. The notation -co- indicates a mixture of chemistries in a specific block. The distribution of mixtures of chemistries may be periodic (ordered), random/statistical, or graded within the block. Other "complex" block structures or polymer architectures are also suitable for the invention, provided the materials self-assemble. In this context, a "complex" block structure or polymer architecture signifies more than one monomer, chemistry, configuration, or structure in at least one block, or adjacent to blocks. A combination of different block copolymer starting materials is another such complex architecture.

TABLE 1

| [A]-[B] |
| --- |
| [A]-[B]-[C] |
| [A]-[B]-[C-co-D] |
| [A-co-B]-[C]-[D] |
| [A-co-B]-[C-co-D] |
| [A]-[B]-[C]-[D] |
| [A]-[B]-[C]-[B]-[A] |
| [A]-[B]-[C]-[D]-[E] |

The crosslinked isoporous structures of the invention are asymmetric, symmetric, partially symmetric, or partially asymmetric.

The crosslinked structures of the invention are supported by a porous support, or are unsupported. The crosslinked isoporous structure of the invention is the form of two-dimensional (e.g. films, flat sheets) or three-dimensional (e.g. monoliths, beads, hollow fibers, tubular) configuration.

The crosslinked isoporous structures of the invention are suitable as a separation media, or as a fabric with desirable protective properties (e.g. clothing, bandages) and thus the materials can be used as a separation media, or as a fabric with desirable protective properties. In the liquid-based separation application, the liquids being exposed to the crosslinked isoporous structures of the invention are not limited to purely aqueous solutions. The chemical stability imparted to the crosslinked isoporous structures of the invention from the crosslinking allows solutions contacting the membrane to contain in part, or completely, non-aqueous liquids, as well as aqueous solutions that may otherwise degrade, decompose, or dissolve non-crosslinked structures. The harsh media in which the crosslinked isoporous structures of the invention are used include highly acidic solutions, highly basic solutions, petrochemical products, organic solvents, and other organic small molecules. The crosslinking of the block copolymers also imparts further heat resistance to the membranes, allowing operation at elevated temperatures.

Figure 4:
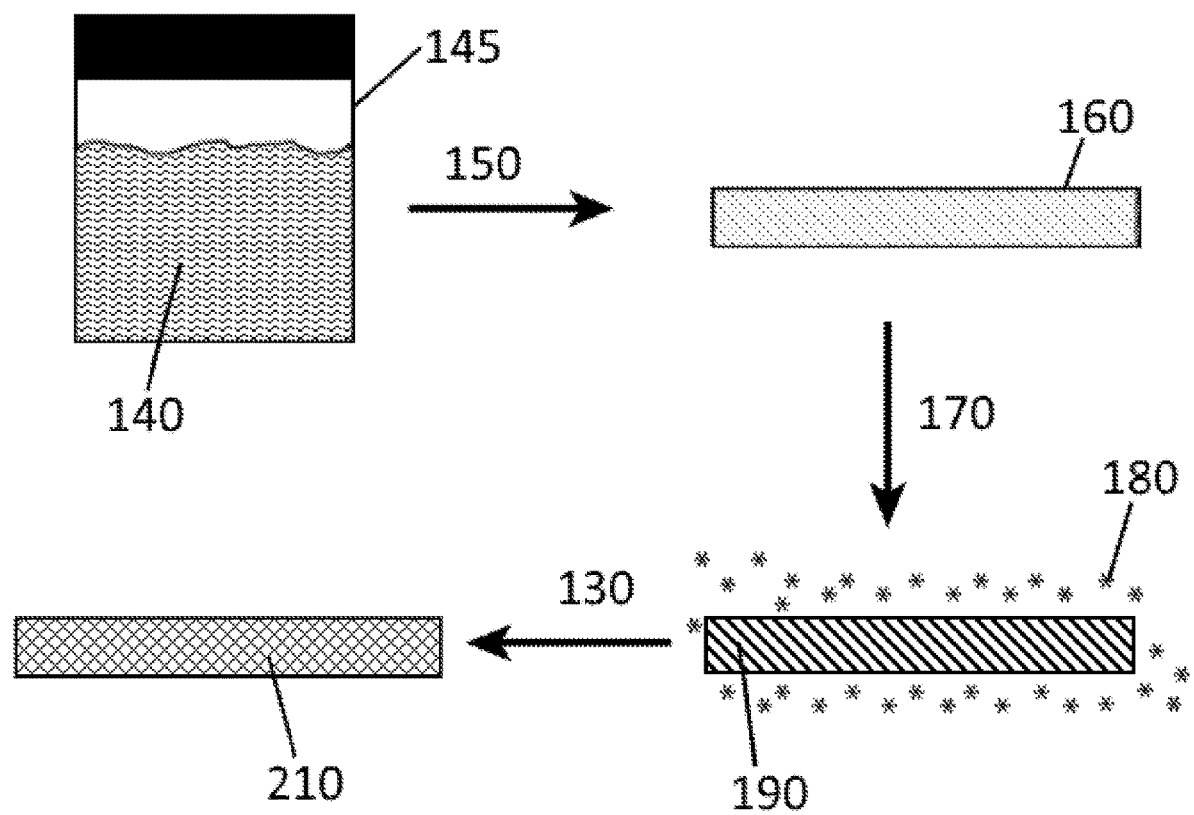
FIG. 4 is an illustration of a method for making the material of the invention
Figure 5:
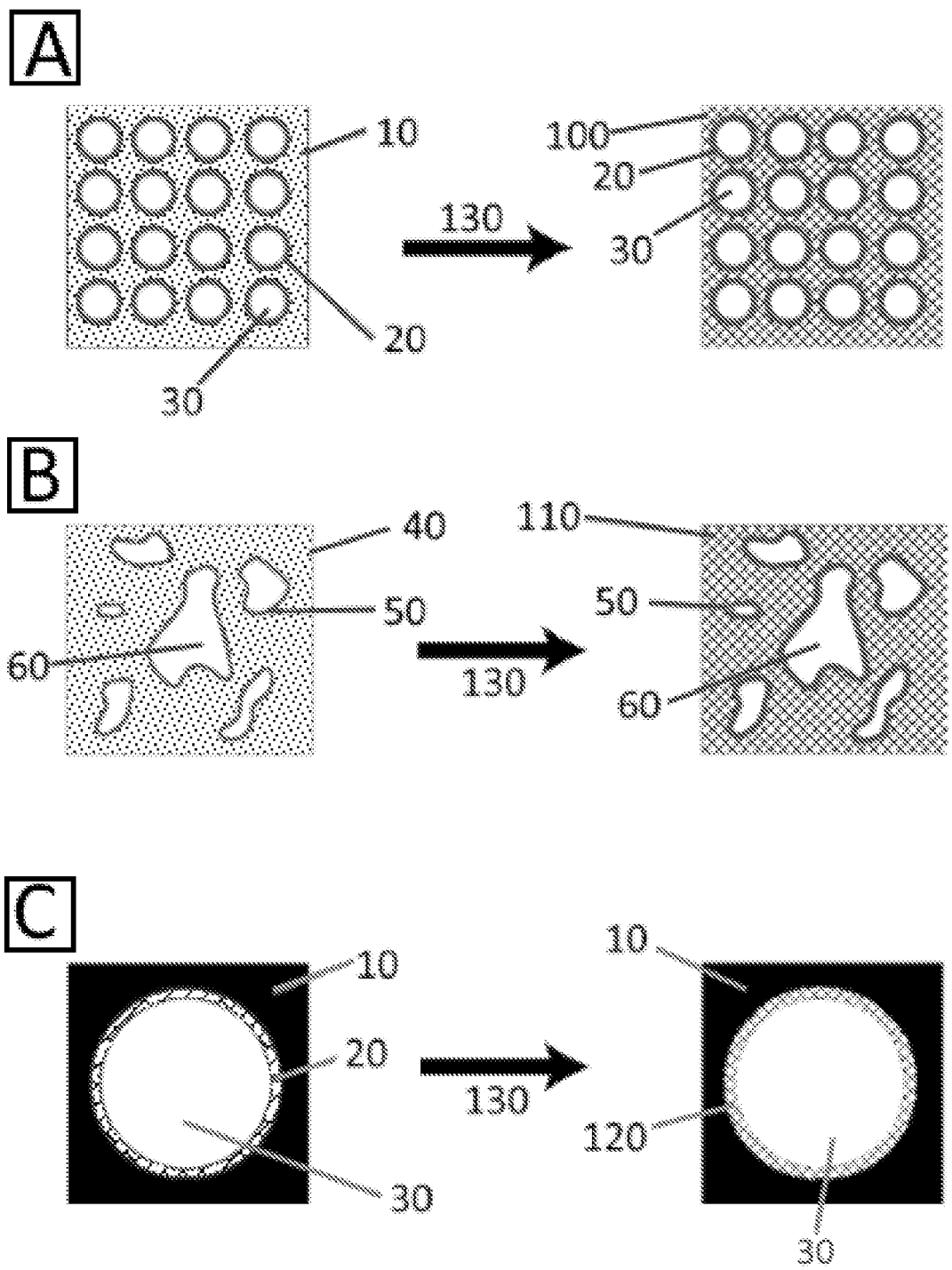
FIG. 5A is an illustration of crosslinking the polymer matrix at a mesoporous region of the material of the invention
FIG. 5B is an illustration of crosslinking the polymer matrix at a macroporous region of the material of the invention
FIG. 5C is an illustration of crosslinking the pore lining polymer region of a mesopore of the material of the invention

The multiblock polymer must at least partially self-assemble when processed from a deposition solution comprising the multiblock polymer and a solvent system. During the process, at least a portion of the solvent system is removed; then, the material is exposed to a phase separation solvent system, such that at least a portion of the polymer material precipitates. Once the pores of the isoporous material are formed, the material is crosslinked through a chemical reaction whereby both material surface cross-linking and interstitial pore cross-linking can occur, which would not occur if cross-linking was conducted prior to pore formation, as illustrated in FIG. 4. The region of the porous material that is crosslinked is not limited to one region. For example, macroporous regions, or mesoporous regions, or pore lining regions, or any combination thereof may be crosslinked. FIG. 5A illustrates an embodiment where a mesoporous region is crosslinked. FIG. 5B illustrates an embodiment where a macroporous region of the material is crosslinked. FIG. 5C illustrates an embodiment where a pore lining polymer region of a mesopore of the material is crosslinked.

One approach for achieving the invention is: 1) Dissolution of multiblock polymer and optionally crosslinking agent, in at least one chemical solvent 2) Dispensing polymer solution onto a substrate or mold, or through a die or template 3) Removal of at least a portion of chemical solvent 4) Exposure to a nonsolvent causing precipitation of at least a portion of the polymer 5) Optionally, a wash step 6) Optionally, exposure to a crosslinking agent 7) Crosslinking reaction In some embodiments, the crosslinking reaction is a thiol-ene reaction, wherein multiple thiol units of a multifunctional thiol react with multiple -ene (double bond) units. One example of this embodiment is shown below wherein three double bonds on poly(isoprene) units on different polymer chains react with a trifunctional thiol crosslinker, forming crosslinks:

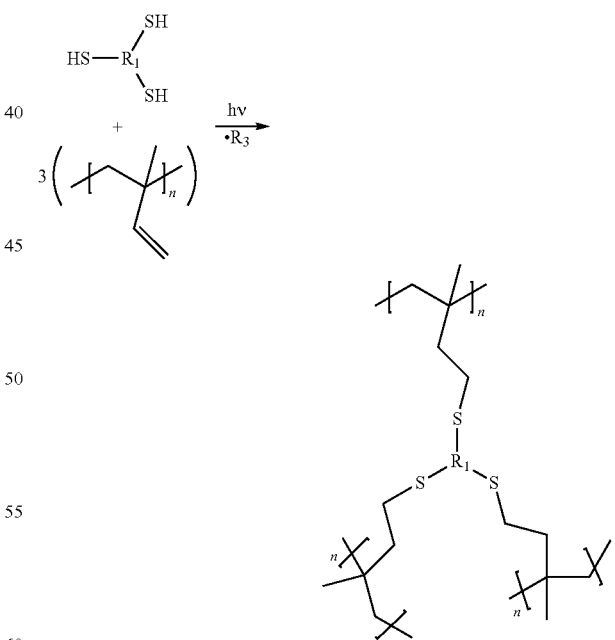

A photoinitiator ($\cdot R^3$) generates radicals with UV irradiation to facilitate the reaction. In one embodiment, a radical generator may be thermally activated to generate radicals In some embodiments, the crosslinking reaction is a radical reaction of two polystyrene units reacting to form crosslinks, as shown below:

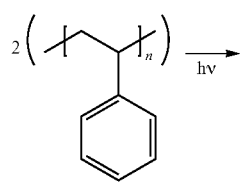

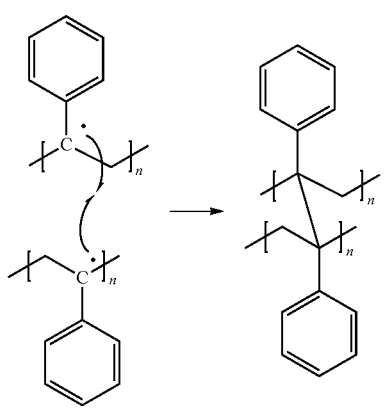

In some embodiments, the crosslinking reaction involves a multifunctional crosslinking agent reacting with multiple amine units. In one embodiment, the multifunctional crosslinking agent contains two or more reactive halides selected from bromine, chlorine, and iodine. The halides react with different amine units to generating the crosslinks. An example of this approach is shown below wherein two vinylpyridine units of poly(4-vinylpyridine) on different polymer chains, where $R^1$ and $R^2$ represent the adjacent polymer chains, and y is equal the number of vinylpyridine monomer units in the 4-vinylpyridine block, react with 1,4-diiodobutane to yield a crosslink:

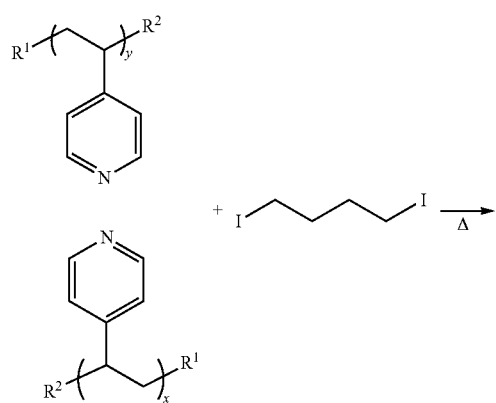

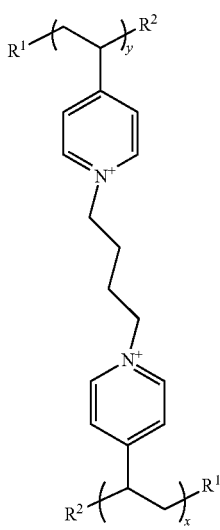

In another embodiment, the multifunctional crosslinking agent contains two or more reactive double bonds of α,β-unsaturated carbonyl units. The different double bonds undergo Michael addition reactions with amines to generate the crosslinks, where $R^1$ and $R^2$ represent the adjacent polymer chain sections, and y is equal the number of vinylpyridine monomer units in the 4-vinylpyridine block, and $R^3$ is defined as a saturated or unsaturated carbon-containing chain of 1 to 12 carbon atoms as shown below:

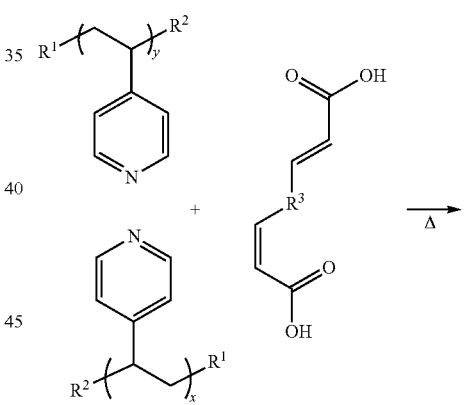

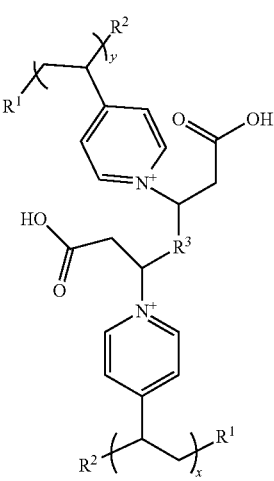

In an embodiment, the multifunctional crosslinking agent contains more than one type of aforementioned crosslinking chemistry (e.g. reactive thiol unit and reactive halide unit, or reactive α,β-unsaturated carbonyl and reactive halide unit). One embodiment where $R^1$ and $R^2$ represent the adjacent polymer chain sections, and y is equal the number of vinylpyridine monomer units in the 4-vinylpyridine block, and $R^3$ is defined as a saturated or unsaturated carbon-containing chain, as shown below:

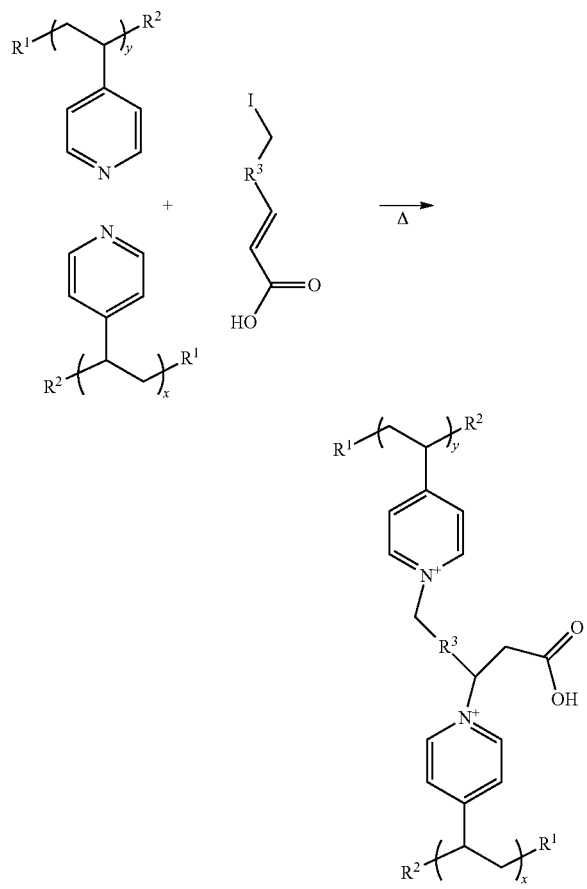

In another embodiment, more than one different crosslinking agent is used to crosslink.

Figure 2:
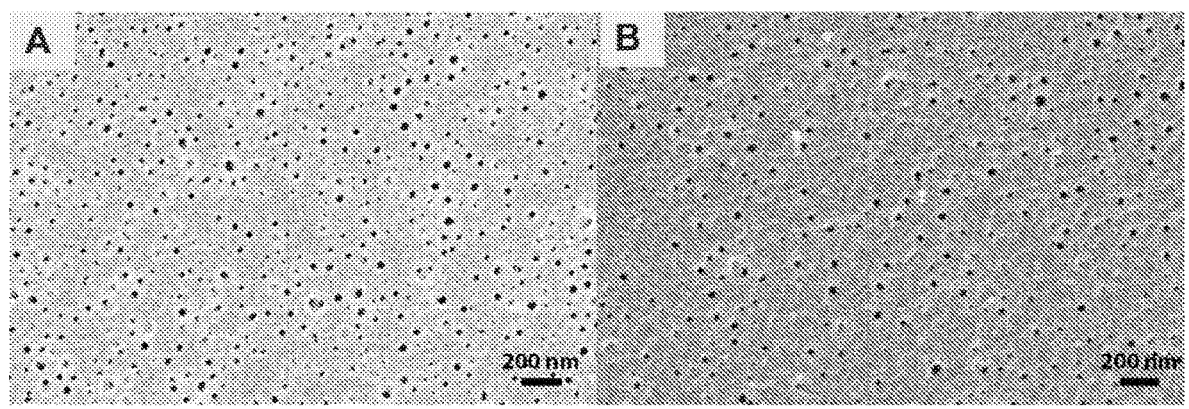
FIG. 2A-2B are scanning electron images of a crosslinked poly(isoprene)-b-poly(styrene)-b-poly(4-vinylpyridine) isoporous asymmetric material (as described below before and after tetrahydrofuran (THF) exposure).
Figure 3:
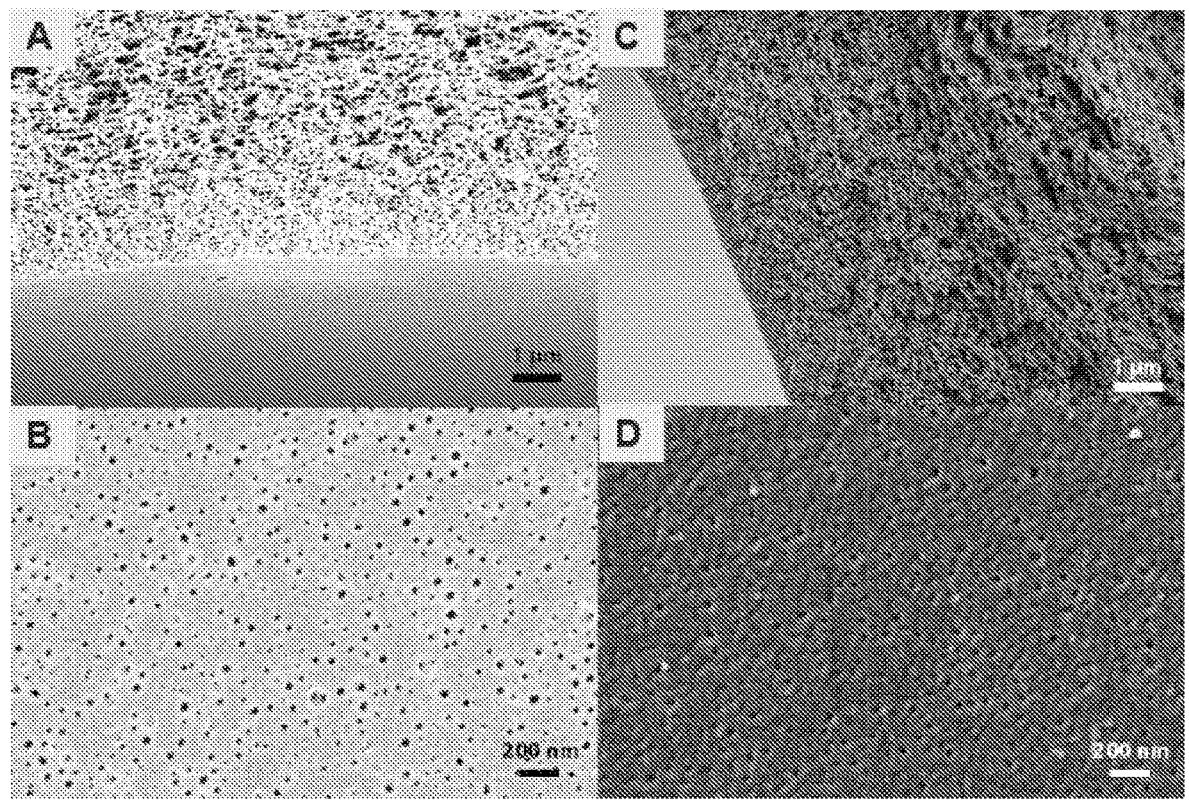
FIG. 3A-3D are scanning electron images of a crosslinked poly(isoprene)-b-poly(styrene)-b-poly(4-vinylpyridine) isoporous asymmetric material (as described below before and after propylene glycol monomethyl ether acetate (PGMEA) exposure).

In one embodiment, the block copolymer is the triblock terpolymer poly(isoprene)-b-(styrene)-b-(4-vinylpyridine) (ISV). The polymer has a volume fraction of about 0.30 poly(isoprene) (PI), 0.55 poly(styrene) (PS), and 0.15 poly (4-vinylpyridine) (P4VP). The polymer is dissolved in a mixture of solvents: 1,4-dioxane and tetrahydrofuran (THF), with a mass ratio of about 7:3 dioxane:THF. A crosslinking agent, pentaerythritol tetrakis(3-mercaptopropionate (PETMP), and photoinitiator, 1-hydroxycyclohexyl phenyl ketone, are added to the polymer solution. The PETMP is about 20% the mass of the polymer, the photoinitiator is about 5% of the mass of the polymer. The solution is processed into a self-assembled asymmetric membrane on a PET support through the aforementioned approach. The membrane is crosslinked using the aforementioned approach through exposure to 254 nm UV irradiation in ambient with a dose of 30 mW/cm2 for 5 minutes on each side. After crosslinking, the membranes show increased solvent resistance, as shown in FIGS. 1A-1D, 2A-2B, and 3A-3D. FIG. 1A shows a scanning electron microscopy (SEM) image of the membrane's cross-section before solvent exposure and FIG. 1C shows an SEM image of the cross-section after exposure to dimethylformamide (DMF) for 1 minute: the cross-sectional porosity is retained. FIG. 1B shows an SEM image of the selective surface layer prior to solvent exposure and FIG. 1D shows and SEM image of the selective surface layer after 1 minute exposure to DMF: the surface porosity is retained, indicating solvent resistance. FIG. 2A shows an SEM image of the selective surface layer prior to solvent exposure and FIG. 2B shows and SEM image of the selective surface layer after 1 minute exposure to tetrahydrofuran (THF): the surface porosity is retained, indicating solvent resistance. FIG. 3A shows a scanning electron microscopy (SEM) image of the membrane's cross-section before solvent exposure and FIG. 3C shows an SEM image of the cross-section after exposure to propylene glycol monomethyl ether acetate (PGMEA) for 1 minute: the cross-sectional porosity is retained. FIG. 3B shows an SEM image of the selective surface layer prior to solvent exposure and FIG. 3D shows and SEM image of the selective surface layer after 1 minute exposure to PGMEA: the surface porosity is retained, indicating solvent resistance. Without crosslinking, the three solvents disrupt the surface porosity and/or dissolve the membranes.

In some embodiments, the material of the invention is packaged as a device including: a pleated pack, flat sheets in a crossflow cassette, a spiral wound module, hollow fiber, a hollow fiber module, or as a sensor. In an embodiment, a device utilizes more than one different material of the invention.

In one embodiment, the material or device comprising the material of the invention has a detectable response to a stimulus/stimuli. For example, the material or device may have a detectable photochemical or electrochemical response to a specific stimulus.

In some embodiments, the material of the invention, or a device comprising the material of the invention, is used in a process wherein an analyte of interest is separated in a medium containing the analyte of interest contacting the material or device. In one such process, the analyte of interest is separated by binding and eluting. In another such process, solutes or suspended particles are separated by filtered. In another such process, both bind and elute and separation by filtration mechanisms are incorporated.

In some embodiments, the material of the invention, or a device comprising the material of the invention, is used in a process wherein an analyte of interest is detected in a medium containing the analyte of interest contacting the material or device. In one such process, the analyte of interest is detected by a response of the material/device to the presence of the analyte of interest.

In some embodiments, more than one different material of the invention is packaged together as a kit. In other embodiments, more than one device comprising the material of the invention is packaged together as a kit. For example, a kit may include multiple materials of the invention; the materials may be the same or different. For example, a kit may include multiple devices comprising the material of the invention; the devices may be the same or different.

In some embodiments, the material of the invention is immobilized to or integrated with a support or a textile. For example, the materials may be supported on a porous or nonporous support for mechanical integrity. In another example, the material may be integrated with a textile for a garment such as a gas permeable but solvent resistant garment.

One approach for the fabrication of the invention is post-modifying isoporous block copolymer materials to be crosslinked. This approach involves directly chemically modifying the multiblock polymer.

The amount of crosslinking and chemistry is controllable. This is controlled through varying the amount of crosslinking reagents or crosslinking conditions e.g. UV dose, temperature, crosslinking agent concentration. One or more different crosslinking chemistries and/or one or more different polymer blocks may be used.

One variant is partially or completely crosslinking units of more than one block of the constituent copolymer. Which block(s) is/are crosslinked is not limited to the block that comprises the structure's major surface.

The porous material has a layer having a thickness of from about 5 nm to about 500 nm, in unit (nm) increments and ranges therebetween, and a plurality of mesopores about 1 nm to about 200 nm in diameter, in said layer. In an embodiment, the mesopores are in the range of about 1 nm to about 200 nm. In an embodiment, the mesopores are in the range of about 3 nm to about 200 nm. In an embodiment, the mesopores are in the range of about 5 nm to about 200 nm. In an embodiment, the mesopores are in the range of about 1 nm to about 100 nm. In an embodiment, the mesopores are in the range of about 5 nm to about 100 nm. In an embodiment, the mesopores are in the range of about 10 nm to about 100 nm. The material may also have a bulk layer having a thickness of from about 2 microns to about 500 microns, including macropores having a size of from about 200 nm to about 100 microns. Isoporous block copolymer membranes incorporating crosslinking in/on at least a portion of at least one block of the block copolymer. This imparts chemical resistance to the membranes. The crosslinked material exhibits increased resistance to temperature or harsh media compared to the uncrosslinked material.

The pore size of the mesoporous region of the membrane is also controllable.

The polymers may be synthesized in any manner with the proviso that the polymer can self-assemble and form the porous material through the methods of the invention and at least a portion of at least one block can be subsequently crosslinked.

Advantages of this invention include: no required thermal annealing for the self-assembly process, no wasted material necessitating removal to form porosity, enables thick material for mechanical stability, enables freestanding material, enables asymmetric structures for increased surface accessibility.

Table of selected features of FIGS. 1-5

| Label | Feature |
|---|---|
| 10 | Polymer matrix of mesoporous region |
| 20 | Pore lining polymer region of mesoporous region |
| 30 | Mesopore (void) |
| 40 | Polymer matrix of macroporous region |
| 50 | Pore lining polymer region of macroporous region |
| 60 | Macropore (void) |
| 100 | Crosslinked polymer matrix of mesoporous region |
| 110 | Crosslinked polymer matrix of macroporous region |
| 120 | Crosslinked pore lining polymer region of mesoporous region |

-continued

Table of selected features of FIGS. 1-5

| Label | Feature |
|---|---|
| 130 | Crosslinking reaction |
| 140 | Polymer solution with or without crosslinker in storage container |
| 145 | Storage container |
| 150 | Dispensing polymer solution into desired configuration |
| 160 | Self-assembling polymer solution |
| 170 | Exposure to nonsolvent |
| 180 | Nonsolvent molecule |
| 190 | Precipitating polymeric material |
| 210 | Porous crosslinked polymer material |

What is claimed as new and desired to be protected by Letters Patent of the United States is:

1. A method of preparing a self-assembled multiblock crosslinked polymer material, comprising:
    a) forming an isoporous structure comprising macropores and mesopores, from a multi-block copolymer material, wherein the multi-block copolymer material comprises polymer chains, wherein polymer chain comprises a first distinct block which is a poly(4-vinylpyridine); and
    wherein the forming includes allowing the multi-block copolymer material to self assemble into a bulk layer having a thickness of 2 microns to 500 microns and a second layer having a thickness of 5 nm to 500 nm, wherein the bulk layer comprises macropores having a size of 200 nm to 100 microns, wherein the second layer comprises mesopores having a size of 1 nm to 200 nm, and wherein a portion of macropores and/or mesopores are isoporous; and
    b) then crosslinking a portion of the first distinct block with a second distinct block which is a poly(4-vinylpyridine); wherein the first and second distinct blocks are on different polymer chains; and wherein the crosslinking agent is selected from the group consisting of (a) a molecule having two $\alpha,\beta$-unsaturated carbonyl groups, bonded through their respective $\beta$-carbons, to a $C_1$-$C_{12}$ unsaturated or saturated carbon chain; and (b) a molecule having one $\alpha,\beta$-unsaturated carbonyl group bonded from the $\beta$ carbon to a $C_1$-$C_{12}$ unsaturated or saturated carbon chain comprising a $CH_2$—I group.

2. A self-assembled multi-block cross-linked polymer material, comprising polymer chains,
    wherein each polymer chain comprises distinct blocks,
    wherein a portion of a first distinct block is a poly(4-vinylpyridine),
    wherein the portion of the first distinct block is crosslinked to a poly(4-vinylpyridine) on a second distinct block on a different polymer chain, wherein the crosslinking agent is selected from the group consisting of (a) a molecule having two $\alpha,\beta$-unsaturated carbonyl groups bonded from their respective beta carbons to a $C_1$-$C_{12}$ unsaturated or saturated carbon chain; and; (b) a molecule having an $\alpha,\beta$-unsaturated carbonyl group bonded from the $\beta$ carbon to a $C_1$-$C_{12}$ unsaturated or saturated carbon chain comprising a $CH_2$—I;
    wherein the first distinct block and second distinct block are on different polymer chains;
    wherein the self-assembled multi-block cross-linked polymer material has a bulk layer having a thickness of 2 microns to 500 microns and a second layer of thickness of 5 nm to 500 nm;
    wherein the bulk layer comprises macropores having a size of 200 nm to 100 microns; and wherein the second layer comprises mesopores having a size of 1 nm to 200 nm; and wherein at least a portion the macropores and/or a portion of the mesopores are isoporous and wherein the self-assembled multi-block cross-linked polymer material is resistant to non-aqueous liquid.

3. A pleated pack, flat sheets in a crossflow cassette, a spiral wound module, hollow fiber, a hollow fiber module, or a sensor comprising the material of claim 2.

4. The material of claim 2, wherein the material further comprises a porous support onto which the material is self-assembled.

5. The material of claim 2, wherein the material is formed into a three-dimensional structure.

6. The material of claim 2, wherein both the macropores of the bulk layer and the mesopores of the second layer are crosslinked.

7. The material of claim 2, wherein the at least two polymer chains comprise poly(isoprene)-b-(styrene)-b-(4-vinylpyridine) (ISV).

8. The material of claim 2, wherein the material is used as a separation media, or as a fabric.

9. The material of claim 2, wherein the cross-linked polymer material exhibits increased resistance to harsh media compared to the uncross-linked material.

10. The material of claim 2, wherein the cross-linked polymer material exhibits increased resistance to temperature compared to the uncross-linked material.

11. The method of claim 1, wherein the self-assembled multi-block cross-linked polymer material is formed by
 a) dissolving the multi-block polymer in at least one chemical solvent to form a polymer solution;
 b) dispensing the polymer solution onto a substrate or mold, or through a die or template;
 c) removing of at least a portion of chemical solvent from the dispensed polymer solution;
 d) exposing the remaining polymer solution to a non-solvent causing precipitation of at least a portion of the polymer; and
 e) exposing the precipitated multiblock polymer to a cross-linking agent.

12. The method of claim 11, wherein the polymer solution is dispensed through a die.

13. The method of claim 11, wherein the multi-block polymer comprises at least one block comprising at least one aromatic ring that crosslinks upon UV radiation exposure.

14. The method according to claim 13, wherein the at least one block comprising at least one aromatic ring that crosslinks upon UV radiation exposure crosslinks in the presence of a UV-activated radical initiator.

* * * * *